(12) United States Patent
Allidieres et al.

(10) Patent No.: US 10,753,539 B2
(45) Date of Patent: Aug. 25, 2020

(54) STATION AND METHOD FOR FILLING A TANK WITH A FUEL GAS

(71) Applicant: L'Air Liquide, Societe Anonyme pour l'Etude et l'Exploitation des Procedes Georges Claude, Paris (FR)

(72) Inventors: Laurent Allidieres, Sant Martin D'Uriage (FR); Julie Flynn, Moirans (FR); Clemence Devilliers, Mont-Bonnot-Saint-Martin (FR); Thibaut Francois, Fontanil Cornillon (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 15/565,573

(22) PCT Filed: Apr. 5, 2016

(86) PCT No.: PCT/FR2016/050772
§ 371 (c)(1),
(2) Date: Oct. 10, 2017

(87) PCT Pub. No.: WO2016/162626
PCT Pub. Date: Oct. 13, 2016

(65) Prior Publication Data
US 2018/0119882 A1 May 3, 2018

(30) Foreign Application Priority Data
Apr. 10, 2015 (FR) ...................................... 15 53138

(51) Int. Cl.
*F17C 5/06* (2006.01)
*F17C 5/00* (2006.01)
*F17C 13/02* (2006.01)

(52) U.S. Cl.
CPC ................ *F17C 5/06* (2013.01); *F17C 5/007* (2013.01); *F17C 13/025* (2013.01);
(Continued)

(58) Field of Classification Search
CPC .......... F17C 5/06; F17C 5/007; F17C 13/025; F17C 2201/018; F17C 2203/0604;
(Continued)

(56) References Cited

U.S. PATENT DOCUMENTS 5,603,360 A * 2/1997 Teel .......................... F17C 5/06
137/267
5,676,180 A * 10/1997 Teel .......................... F17C 5/06
137/267

(Continued)

FOREIGN PATENT DOCUMENTS

CN    204 254 250    4/2015
DE    298 16 811    10/1999
(Continued)

OTHER PUBLICATIONS

International Search Report and Written Opinion for PCT/FR2016/050772, dated Jun. 21, 2016.
(Continued)

*Primary Examiner* — Timothy L Maust
(74) *Attorney, Agent, or Firm* — Christopher J. Cronin

(57) ABSTRACT

The invention relates to a station and method for filling a tank with a fuel gas. Said station includes at least one fuel gas source store and a gas transfer system having a first upstream end connected to the source store(s) and a second downstream end that is in fluid communication with the tank. The gas transfer system includes at least one control valve, characterized in that the at least one source store includes a rigid outer wall and a flexible sealing wall that is arranged inside the space defined by the rigid outer wall. The
(Continued)

flexible wall defines a storage space for the fuel gas. The first upstream end of the system is connected to the storage space defined by the flexible wall. The at least one control valve is also characterized in that the space located between the flexible wall and the outer wall is connected to a system for transferring liquid into the source store in order to fill or extract the liquid in the source store and control the pressure in the store when filling and/or extracting fuel gas within the sealing wall.

15 Claims, 1 Drawing Sheet

(52) U.S. Cl.
CPC .............................. *F17C 2201/018* (2013.01); *F17C 2201/0185* (2013.01); *F17C 2201/032* (2013.01); *F17C 2203/0604* (2013.01); *F17C 2203/0619* (2013.01); *F17C 2205/0142* (2013.01); *F17C 2205/0326* (2013.01); *F17C 2205/0338* (2013.01); *F17C 2205/0341* (2013.01); *F17C 2221/012* (2013.01); *F17C 2221/033* (2013.01); *F17C 2223/0123* (2013.01); *F17C 2223/0161* (2013.01); *F17C 2223/033* (2013.01); *F17C 2225/0123* (2013.01); *F17C 2225/036* (2013.01); *F17C 2227/0135* (2013.01); *F17C 2227/0157* (2013.01); *F17C 2227/0192* (2013.01); *F17C 2227/0302* (2013.01); *F17C 2227/0337* (2013.01); *F17C 2227/0393* (2013.01); *F17C 2227/043* (2013.01); *F17C 2250/0631* (2013.01); *F17C 2260/02* (2013.01); *F17C 2265/065* (2013.01); *F17C 2270/0139* (2013.01); *Y02E 60/321* (2013.01)

(58) Field of Classification Search
CPC ........ F17C 2203/0123; F17C 2221/012; F17C 2227/043; Y02E 60/321
See application file for complete search history.

(56) References Cited

U.S. PATENT DOCUMENTS

| | | | | |
|---|---|---|---|---|
| 5,908,141 A * | 6/1999 | Teel | ........................... | F17C 5/06 141/18 |
| 7,028,724 B2 * | 4/2006 | Cohen | ................ | F02M 21/0206 141/392 |
| 7,470,293 B2 * | 12/2008 | Edlund | ...................... | B01J 3/03 141/3 |
| 7,500,497 B2 * | 3/2009 | Michel | ...................... | F17C 5/04 141/11 |
| 7,624,770 B2 * | 12/2009 | Boyd | ...................... | F17C 5/007 141/11 |
| 8,091,593 B2 | 1/2012 | Allidieres | | |
| 8,191,584 B2 * | 6/2012 | Kesten | ...................... | F17C 5/04 141/11 |
| 8,671,997 B2 * | 3/2014 | Allidieres | ................. | F17C 5/06 141/104 |
| 9,033,178 B2 * | 5/2015 | White | ...................... | F17C 5/02 220/560.04 |
| 9,541,236 B2 * | 1/2017 | Kuehl | ...................... | F17C 5/06 |
| 9,618,159 B2 * | 4/2017 | Gouva | ...................... | F17C 5/06 |
| 2002/0129867 A1 | 9/2002 | Krasnov | | |
| 2004/0188449 A1 | 9/2004 | Thompson | | |
| 2005/0287407 A1 * | 12/2005 | Bushko | ............. | H01M 8/04089 141/82 |
| 2006/0090396 A1 | 5/2006 | Edlund et al. | | |
| 2008/0202629 A1 * | 8/2008 | Michel | ...................... | F17C 5/04 141/5 |
| 2009/0229701 A1 | 9/2009 | Allidieres et al. | | |
| 2010/0307636 A1 * | 12/2010 | Uemura | ................... | F17C 5/06 141/4 |
| 2011/0041949 A1 * | 2/2011 | Gupta | ...................... | F17C 7/04 141/4 |
| 2011/0048576 A1 | 3/2011 | Meisner | | |
| 2014/0196814 A1 * | 7/2014 | Nagura | ................. | F17C 13/026 141/82 |

FOREIGN PATENT DOCUMENTS

| | | |
|---|---|---|
| DE | 198 43 669 | 3/2000 |
| EP | 2 438 346 | 4/2012 |
| JP | 2005 273 811 | 10/2005 |
| JP | 2007-016975 | 1/2007 |
| JP | 2009-510352 | 3/2009 |
| WO | WO2014/094070 | 6/2014 |

OTHER PUBLICATIONS

French Search Report and Written Opinion for FR 1 553 138, dated Jan. 25, 2016.

* cited by examiner

US 10,753,539 B2

STATION AND METHOD FOR FILLING A TANK WITH A FUEL GAS

CROSS-REFERENCE TO RELATED APPLICATIONS

This application is a § 371 of International PCT Application PCT/FR2016/050772, filed Apr. 5, 2016, which claims § 119(a) foreign priority to French patent application FR 1553138, filed Apr. 10, 2015.

BACKGROUND

Field of the Invention

The present invention concerns a station and a method for filling tanks with pressurized gas.

The invention more particularly concerns a station for filling a tank with a pressurized fuel gas, notably hydrogen, including at least one fuel gas source store and a gas transfer circuit having an upstream first end connected to the source store(s) and a downstream second end intended to be in fluid communication with the tank to be filled, the gas transfer circuit including at least one valve for controlling the transfer of gas from the source store to the tank.

The invention applies in particular to filling pressurized hydrogen tanks.

Related Art

Hydrogen gas filling stations for vehicles powered by fuel cells must enable filling of the tanks in a few minutes (3 to 5 minutes for example for onboard tanks at a pressure of 700 bar). The quantities of gas to be transferred in this time interval (for example 5 to 7 kg) rule out direct filling from a high-pressure compressor, failing investment in compressors of very high instantaneous electrical power having a high inlet pressure (for example greater than 100 bar). The transfer is therefore generally effected from stores at higher pressure and integrated into the station by effecting successive balancings with one or more fixed stores installed at the station (this is known as "cascade" filling).

Known systems necessitate source stores of relatively large size and/or in relatively high numbers, for example.

Moreover, this solution entails installing in the station high-capacity high-pressure stores since only a portion of the contents is actually transferred into the tank of the vehicle by such balancing (high residual quantities). Moreover, to fill the tank completely whilst minimizing the number of source stores it is necessary to carry out a plurality of successive balancings at increasingly high pressures. This necessitates the installation of a complex system of valves.

It is known to provide pressurized gas tanks containing inside them a volume of liquid that is reduced as the tank is filled. This solution, described for example in the documents EP2438346A1, JP2005273811A2 and US2011048576A, is designed to prevent heating of the filled tank above a particular threshold.

SUMMARY OF THE INVENTION

An object of the present invention is to alleviate some or all of the disadvantages of the prior art summarized above.

To this end, the station according to the invention, otherwise conforming to the generic definition thereof given by the above preamble, is essentially characterized in that the at least one source store includes a rigid outer wall and a flexible sealing wall that is arranged inside the space delimited by the rigid outer wall, the flexible wall defining a storage space for the fuel gas, the upstream first end of the circuit being connected to the storage space defined by the flexible wall, the space located between the flexible wall and the outer wall being connected to a circuit for transferring liquid into the source store, in order to fill or extract the liquid in the source store and to control the pressure in the store when filling and/or extracting fuel gas inside the sealing wall.

The use of such gas stores in the filling station offers numerous advantages.

This structure makes it possible to limit the number of source stores necessary in a filling station by optimizing their level of use. The necessity to effect cascade filling can even be eliminated.

The system enables physical separation between the hydrogen and the compression fluid by means of a flexible bladder. It also enables isobaric filling on the station side and therefore limitation of the pressure variations of the store or stores of the station. This can if necessary increase its service life.

The transfer of gas can be effected at constant pressure in the source store and the gas transferred can therefore be maintained at a constant temperature. This enables simplification of the design of a heat exchanger, if any, for cooling the gas farther downstream in the circuit.

Moreover, embodiments of the invention can include one or more of the following features:

- the liquid transfer circuit includes a liquid container and a pump adapted to transfer liquid from the liquid tank to the source store,
- the liquid transfer circuit includes an outlet pipe including a system of valve(s) and connected on the one hand to the source store and on the other hand to the liquid container to evacuate liquid and where applicable gas from the store to the liquid container,
- the outlet pipe includes at least one valve and notably a pressure regulator configured to form a venting system for maintaining a particular pressure difference between the liquid container and the source store,
- the sealing wall defines in the source store a storage space for fuel gas between 0.08 and 0.6 $m^3$ inclusive and preferably between 0.08 $m^3$ and 0.30 $m^3$ inclusive (notably between 75 liters and 300 liters inclusive),
- the liquid transferred by the liquid transfer circuit is at least one of the following: water, water to which an antifreeze compound has been added, oil (notably mineral or silicone oil),
- the gas transfer circuit includes an adsorbent or separator for purifying the gas transferred to the tank of any pollution notably chemical species originating from the liquid contained in the source store (3),
- the station includes a compressor or respectively a pump associated with an evaporator, connected to the gas transfer circuit and in particular to the source store, to enable the filling of the source store with gas from a fuel gas source, respectively from a liquefied fuel gas source, connected to said compressor,
- the station includes a plurality of fuel gas source stores connected in parallel to the upstream first end of the gas transfer circuit via a system of respective valves, the source stores each including a rigid outer wall and a flexible sealing wall arranged inside the space defined by the rigid outer wall, the sealing wall of each store defining a fuel gas storage space connected to the first end of the gas transfer circuit, the space located between the flexible wall and the outer wall of each of the source stores being connected to a circuit for transferring liquid into the source store to fill or extract liquid in the stores and to control the pressure in the stores when filling and/or extracting gas inside the sealing wall of the stores, the station includes a liquid container and a pump connected to the liquid transfer circuit to enable the transfer of liquid from the liquid container (6) to the store with a particular flow rate, the gas transfer circuit includes a heat exchanger for selective cooling of the gas transferred to the tank, the compressor is connected to the gas transfer circuit and notably to the second end of said circuit without passing through the at least one source store to enable direct filling of a tank, the at least one source store is disposed vertically and includes an orifice at the bottom connecting the first end of the gas transfer circuit to the space defined by the flexible envelope and an orifice at the top connecting the volume located between the flexible wall and the outer wall to the liquid transfer circuit, the liquid container includes a degassing vent for pressures above a particular threshold.

The invention also concerns a method of filling a tank with a pressurized fuel gas, notably hydrogen, by means of a filling station including at least one fuel gas source store and a gas transfer circuit having an upstream first end connected to the source store and a second end in fluid communication with the tank to be filled, the gas transfer circuit including at least one valve for controlling the transfer of gas from the source store to the tank, the at least one source store including a rigid outer wall and a flexible sealing wall that is arranged inside the space defined by the rigid outer wall, the sealing wall defining a storage space for fuel gas, the upstream first end of the circuit being connected to the storage space defined by the flexible wall, the space located between the flexible wall and the outer wall being connected to a circuit for transferring liquid in the source store to fill or extract liquid in the store, the method including a step of monitoring the pressure in the store when filling and/or extracting fuel gas inside the sealing wall by simultaneous injection or removal of liquid in the at least one source store.

According to other possible features:

the method includes a step of transfer of gas from the at least one source store to the tank and, simultaneously with this transfer of gas, liquid is injected into the at least one source store to limit or prevent the pressure drop in said source store, the method includes a step of filling the at least one source store by transfer of gas from a source of pressurized fuel gas and, simultaneously with this transfer of gas, liquid is extracted in the at least one source store to limit or prevent the pressure rise in said source store, the at least one source store contains fuel gas at a pressure between 200 and 1000 bar inclusive and preferably between 300 and 900 bar inclusive.

The invention can also concern any alternative device or method comprising any combination of the features described above or below.

Other features and advantages will become apparent on reading the following description given with reference to the figures, in which:

DETAILED DESCRIPTION OF THE INVENTION

Figure 1:
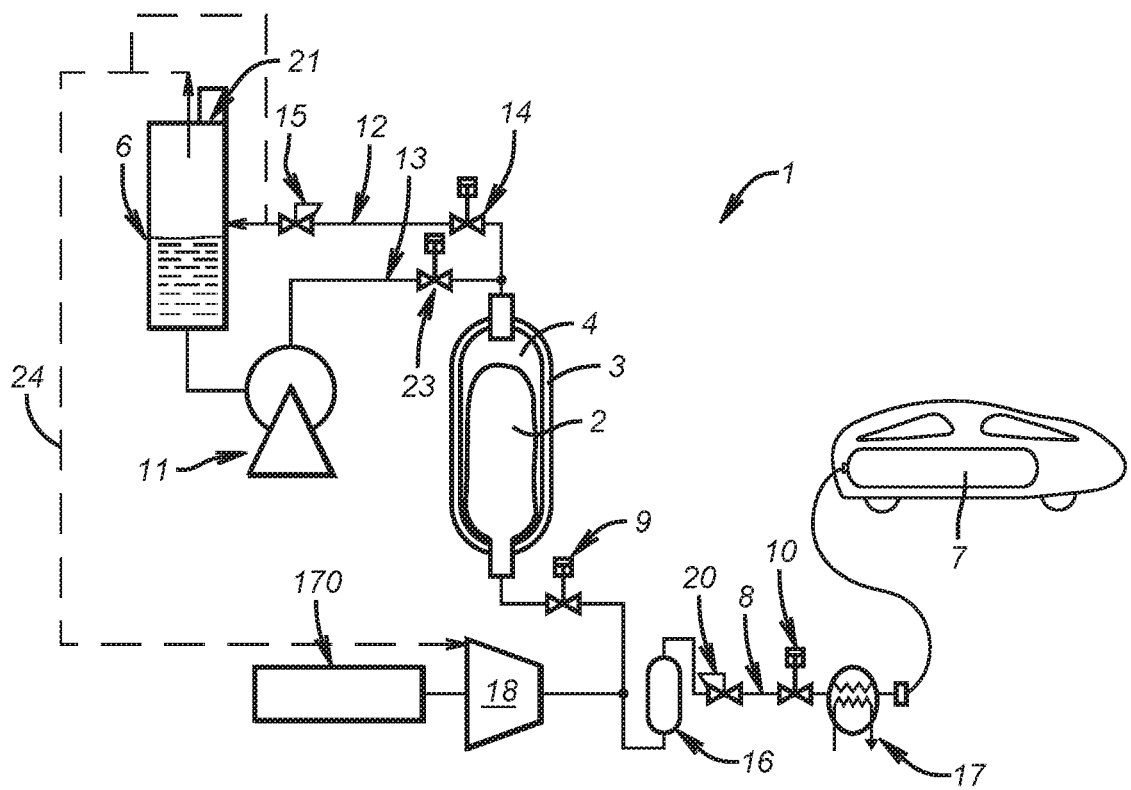
FIG. 1 is a diagrammatic partial view of a filling station showing the structure and the operation of a first embodiment of the invention.

The example of a filling station 1 shown in FIG. 1 conventionally includes a source store 3 of fuel gas (such as hydrogen) and a gas transfer circuit 8. The gas transfer circuit 8 has an upstream first end connected to the source store 3 and a downstream second end intended to be in fluid communication with the tank 7 to be filled (for example via a quick-connect system at the end of a hose).

The gas transfer circuit 8 includes at least one valve 9, 10 for controlling the transfer of gas from the source store 3 to the tank 7. For example, the circuit can include between the source store 3 and the downstream end a first valve 9 (for example a controlled valve), a pressure regulator 20 then a second valve.

According to one advantageous feature, the source store 3 includes a rigid, for example composite, outer wall and a flexible sealing wall 2 that is arranged inside the space defined by the rigid outer wall.

The flexible wall 2 therefore forms a flexible bladder defining a sealed storage space for the fuel gas.

The upstream first end of the circuit 8 is connected to the storage space defined by the flexible wall 2. The space located between the flexible wall 2 and the outer wall is connected to a circuit 12, 13 for transferring liquid in the source store 3 in order to fill or extract the liquid in the source store 3 and thereby to control the pressure in the store 3 when filling and/or extracting fuel gas inside the sealing wall 2.

Without this being limiting on the invention as such, the source storage structure 3 can conform to that described in the document EP2438346A1. In particular, the flexible sealing wall 2 can be connected to the rigid wall only at the level of a neck or orifice of the source store 3. Likewise, this flexible sealing wall 2 can be mounted either permanently in the rigid wall or removable, notably for inspection and to enable its replacement if necessary. For example, the rigid wall of the source store 3 is made from a composite material. In other words this source store can be an IV type tank with an intermediate liner positioned between the flexible wall 2 (bladder) and the rigid wall of the store.

Of course, any other appropriate structure can be envisaged. Likewise, the flexible wall can be replaced by any other equivalent mobile or deformable partition system enabling separation of the gas from the liquid.

In this way, a vehicle tank 7 can be filled in an isobaric manner by injecting an incompressible fluid into the space between the flexible wall 2 confining the gas and the rigid wall.

The liquid is for example water (where applicable with antifreeze added to it), oil (mineral, silicone or other oil) or any other appropriate liquid or fluid.

The necessary volume of the source store 3 is preferably of an order of magnitude equal to the volume of the tank 7 to be filled. The source store 3 of the station 1 advantageously has a volume slightly greater than the volume of the tank 7 in order to prevent excessive crushing of the bladder (flexible wall 2) during the transfer of gas at the end of filling.

The transferred gas flow rate can be controlled entirely by controlling the flow rate of liquid introduced into the source store 3. This can make it possible to dispense with a filling flow rate control valve.

As shown in FIG. 1, the liquid transfer circuit 12, 13 can include a liquid container 6 and a pump 11 adapted to enable the transfer of liquid from the liquid tank 6 to the source store 3 when necessary (notably at a particular flow rate).

As shown, the liquid transfer circuit 12, 13 can include a first pipe 13 including the pump 11 (and preferably a valve 23) for transferring liquid from the liquid container 6 to the store 3 and an outlet second pipe 12 to enable the transfer of the liquid and where applicable of the gas from the store 3 to the liquid container 6. The outlet pipe 12 can include a system of valve(s) 14, 15, for example a first valve 14 in series with a pressure regulator or a pressure relief valve.

This forms a venting system for maintaining a particular pressure difference between the liquid container 6 and the source store 3. In particular, the container 6 can be at the ambient atmospheric pressure.

Accordingly, in the case of the hydrogen fuel gas, the permeation hydrogen having migrated through the bladder 2 and dissolved in the liquid can be collected in the source store 3 and degassed in a controlled and centralized manner via a vent 21. This gas can if required be recovered, possibly dried and de-oiled, and recompressed and reused, for example reinjected into the source store 3.

As diagrammatically indicated by the dashed line or lines 24, the recovered gas can be recycled (used) at the inlet of the compressor 18. This increases efficiency and reduces losses.

The station 1 can include a compressor 18 and/or respectively a pump associated with an evaporator for filling the source store 3.

This compressor 18 (or the pump with evaporator fed with liquefied gas) can be connected to the gas transfer circuit 8 (for example via a valve 22, see FIG. 2) and in particular to the source store 3 to enable filling of the source store 3 with pressurized gas.

To fill the space defined by the flexible wall 2 with fuel gas hydrogen supplied by the source 170 can be compressed/evaporated to a particular pressure, for example a pressure greater than 900 bar.

This pressure can be controlled by the pressure regulator 15 on the outlet pipe 12 and/or via the other valve 14 on this pipe 12.

When filling the store 3, the incompressible liquid contained therein is then evacuated to the liquid container 6.

The pressure regulator 15 on the outlet pipe can be set to a pressure greater than the pressure of the downstream pressure regulator 20 on the transfer circuit 8.

When the source store 3 is full or contains sufficient fuel gas, a tank 7 can be filled.

During such filling, a valve 14 on the outlet pipe 12 is closed whereas the valve 23 on the pipe 13 including the pump 11 is open. The pump 11 can then be started.

The flexible wall 2 is then emptied of its gas, and this gas is transferred into the tank 7 via the transfer circuit 8 (downstream valves 9 and 10 open).

A pressure regulator 20 can be provided in the transfer circuit 8 to maintain the pressure inside the flexible wall 2 constant at a value slightly greater than the pressure set by the regulator 15 (less than 900 bar for example).

As shown, the transfer circuit 8 (the pipe connected to the tank 7 to be filled) can include a heat exchanger 17 for cooling the gas and thus at least partly compensating the rise in temperature linked to the adiabatic compression in the tank 7. This can contribute to enabling filling in less than 5 minutes.

Moreover, and as shown in FIG. 1, an (adsorbent or other) tank or separator 16 can be provided in the transfer circuit 8 to eliminate any pollutants in the gas before it enters the tank 7.

Figure 2:
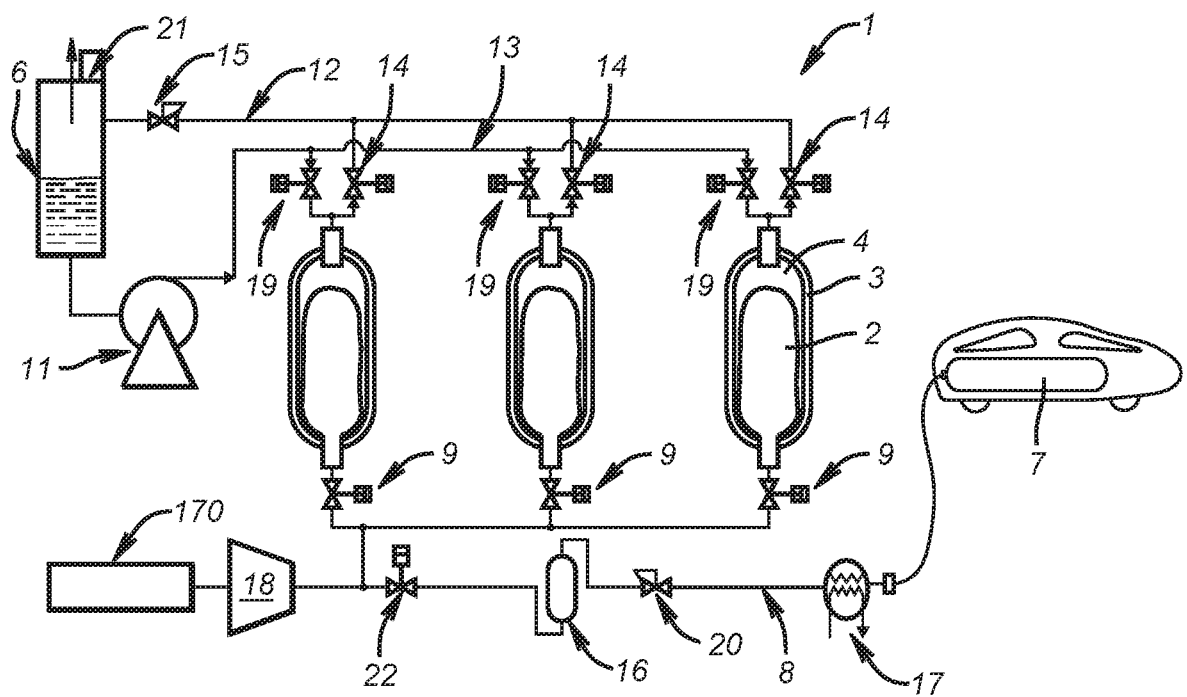
FIG. 2 is a view similar to that of FIG. 1 showing a second embodiment of the invention.

FIG. 2 shows a variant embodiment that differs from that from FIG. 1 only in that the station 1 includes a plurality of (three) source stores 3. The source stores 3 are connected in parallel on the one hand to the first end of the gas transfer circuit 8 (via respective valves 9) and on the other hand to the liquid transfer circuit 12, 13 (via respective valves 14, 19).

The source stores 3 can be filled successively and can be used successively for successive fillings (notably in cascade). This plurality of source stores 3 can notably be provided or used when the tank 7 to be filled has a volume greater than a source store 3.

Moreover, to optimize the filling energy, the source stores 3 can be filled with gas at different pressures (for example 200, 500 and 900 bar). In this case, the pressure regulators 15 and 20 are preferably of the controlled pressure (adjustable pressure value) type. Accordingly, when filling and extracting from a first source store 3, the control pressure (regulators 20 and 15) can be set at a low first value (for example of the order of 200 bar), then an intermediate second pressure (for example 500 bar) for a second source store 3 and finally a high third pressure (for example 900 bar) for the third source store 3.

For practical reasons the pump 11 can be used or dedicated to extraction from a particular source store 3. For example, in this case, a pump 11 can be designed for a first particular working pressure (for example 200 bar for extraction from a first source store), another pump can be provided for a second working pressure of the second source store 3 (for example 500 bar) with a third pump for a third pressure for the third source store 3 (for example 900 bar).

As shown, the source store or stores 3 are preferably oriented and placed vertically (gas interface at the bottom and liquid interface at the top). This arrangement enables collection in the hydraulic circuit 12, 13 of hydrogen that diffuses through the flexible wall 2 in order to degas it in the container 6.

The table below gives comparative examples between the prior art solution in the left-hand columns (a plurality of conventional buffer stores used in cascade) and the solution according to the invention in the right-hand columns (one buffer store according to the invention).

The four lines show four respective examples of hydrogen consumption that the station must be able to achieve (in kg/day and the number of successive fillings) to fill tanks filled at 700 bar.

The second column shows the number, the volume (in liters (l)) and the pressure (in bar) of the source stores 3 used with the above constraints. The third column indicates the quantity of gas stored in this case in the buffer stores 3 (in $Nm^3$).

The fourth and fifth columns correspond to the second and third columns for the solution according to the invention.

Finally the final column shows the (percentage) differences in the quantity of gas stored in the source stores 3 according to the invention compared to the standard solution.

It is readily seen that the invention therefore makes it possible to reduce by approximately 50% the quantities of gas stored in the station compared to the standard solution. This confers advantages in terms of cost and safety.

For example, for a station carrying out three successive fillings (100 kg of hydrogen filled per day), instead of mobilizing two source stores of 800 liters and 1060 $Nm^3$ of hydrogen, the invention can meet this demand with a single smaller buffer store (500 l) with a smaller quantity of stored gas (450 $m^3$).

Moreover, the invention makes it possible to reduce the size of the necessary second compression stage because this second stage is often also used to top up tanks to be filled when effected by conventional pressure balancing.

This can generate a substantial saving per station (for example more than compensating the additional cost for the pump 11).

Of course, the invention can be applied to filling gases other than hydrogen, for example natural gas, methane or other gases (and at different pressures).

The following Table comparing Sizes and Numbers of Source Stores in the Case of Filling Hydrogen Tanks:

| Station | Standard filling | | Filling according to the invention | | |
| --- | --- | --- | --- | --- | --- |
| | Capacity | Stored gas ($Nm^3$) | Capacity | Stored gas ($Nm^3$) | Stored gas quantity difference |
| 100 kg/day by three consecutive fillings | 1 × 800 l at 450 bar + 1 × 800 l at 875 bar | 1060 | 1 × 500 l at 900 bar | 450 | −58% |
| 400 kg/day by eight consecutive fillings | 4 × 800 l at 450 bar + 800 l at 875 bar | 2140 | 1 × 1360 l at 900 bar | 1224 | −43% |
| 100 kg/day by twice three consecutive fillings | 1 × 1300 l at 450 bar + 1 × 1300 l at 875 bar | 1722 | 1 × 1020 l at 900 bar | 918 | −47% |
| 400 kg/day by twice eight consecutive fillings | 8 × 800 l at 450 bar + 2 × 800 l at 875 bar | 4280 | 1 × 2720 l at 900 bar | 2448 | −43% |

Accordingly, whilst being simple and of relatively low cost, the invention offers numerous advantages. It makes it possible to use fewer source stores 3 at the station 1 having water volumes less than those of a standard station.

Moreover, the source stores 3 of the station can be filled and extracted in an isobaric manner. This reduces the cycles of mechanical fatigue thereof.

The diffusion gas flow can moreover be collected at a particular location. The flow rate of filling the tanks 1 can be controlled by the speed of the pump 11.

Moreover, the gas extracted from the source stores 3 remains at constant or quasi constant temperature. This simplifies the determination of the dimensions of a downstream cooling heat exchanger 17.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A station for filling a tank of a fuel cell vehicle with a pressurized fuel gas, the fuel gas being hydrogen, said station comprising at least one fuel gas source store containing the fuel gas at a pressure between 200 and 1000 bar and a gas transfer circuit having an upstream first end connected to the at least one source store and a downstream second end intended to be in fluid communication with the fuel cell vehicle tank to be filled, the gas transfer circuit including at least one valve for controlling the transfer of gas from the source store to the tank, each of the at least one source store including a rigid outer wall and a flexible sealing wall that is arranged inside the space delimited by the rigid outer wall, the flexible sealing wall defining a storage space for the fuel gas, the upstream first end of the circuit being connected to the storage space defined by the flexible sealing wall, the space located between the flexible sealing wall and the outer wall being connected to a circuit for transferring liquid into the source store, in order to fill or extract the liquid in the source store and to control the pressure in the store when filling and/or extracting fuel gas inside the flexible sealing wall, characterized in that the liquid is oil, water, or water to which antifreeze has been added and the gas transfer circuit includes an adsorbent or separator purifying the gas transferred to the tank of any of the oil, water, or antifreeze originating from the liquid contained in the source store.

2. The station of claim 1, wherein the liquid transfer circuit includes a liquid container and a pump adapted to transfer liquid from the liquid tank to the source store.

3. The station of claim 1, wherein the liquid transfer circuit includes an outlet pipe including a system of valve(s) and connected on the one hand to the source store and on the other hand to the liquid container to evacuate liquid and where applicable gas from the store to the liquid container.

4. The station of claim 3, wherein the outlet pipe includes at least one valve and notably a pressure regulator forming a venting system for maintaining a particular pressure difference between the liquid container and the source store.

5. The station of claim 3, wherein the liquid transfer circuit includes a first pipe provided with a pump for transferring the liquid from the liquid container to the store and a second pipe consisting of the outlet pipe.

6. The station of claim 3, wherein the outlet pipe includes a first valve in series with a pressure regulator or a pressure relief valve.

7. The station of claim 1, wherein the flexible sealing wall defines in the source store a storage space for fuel gas between 0.08 and 0.6 m$^3$ inclusive.

8. The station of claim 1, wherein the liquid transferred by the liquid transfer circuit is at least one of the following: water and water to which an antifreeze compound has been added.

9. The station of claim 1, wherein it includes a compressor or respectively a pump associated with an evaporator, connected to the gas transfer circuit and the source store to enable the filling of the source store with gas from a fuel gas source connected to said compressor.

10. The station of claim 1, further comprising a plurality of fuel gas source stores connected in parallel to the upstream first end of the gas transfer circuit via a system of respective valves, the source stores each including a rigid outer wall and a flexible sealing wall arranged inside the space defined by the rigid outer wall, the flexible sealing wall of each source store defining a fuel gas storage space connected to the first end of the gas transfer circuit the space located between the flexible sealing wall and the outer wall of each of the source stores being connected to a circuit for transferring liquid into the source store to fill or extract liquid in the stores and to control the pressure in the stores when filling and/or extracting gas inside the sealing wall of the stores.

11. A method of filling a tank of a fuel cell vehicle with a pressurized fuel gas, the fuel gas being hydrogen, by means of a filling station including at least one fuel gas source store containing the fuel gas at a pressure between 200 and 1000 bar and a gas transfer circuit having an upstream first end connected to the source store and a second end in fluid communication with the fuel cell vehicle tank to be filled, the gas transfer circuit including at least one valve for controlling the transfer of gas from the source store to the tank, each of the at least one source store including a rigid outer wall and a flexible sealing wall that is arranged inside the space defined by the rigid outer wall, the flexible sealing wall defining a storage space for fuel gas, the upstream first end of the circuit being connected to the storage space defined by the flexible sealing wall, the space located between the flexible sealing wall and the outer wall being connected to a circuit for transferring liquid in the source store to fill or extract liquid in the store, the method comprising a step of monitoring the pressure in the source store when filling and/or extracting fuel gas inside the flexible sealing wall by simultaneous injection or removal of liquid in the at least one source store, wherein the liquid is oil, water, or water to which antifreeze has been added, the gas transfer circuit includes an adsorbent or separator purifying the gas transferred to the tank by removing any of the oil, water, or antifreeze originating from the liquid contained in the source store, and the at least one source store contains fuel gas at a pressure between 200 and 1000 bar inclusive.

12. The method of claim 11, further comprising a step of transfer of gas from the at least one source store to the tank, wherein simultaneously with the transfer of gas from the at least one source store to the tank, liquid is injected into the at least one source store to limit or prevent the pressure drop in said source store.

13. The method of claim 11, further comprising a step of filling the at least one source store by transfer of gas from a source of pressurized fuel gas, wherein simultaneously with the transfer of gas from the source to the tank, liquid is extracted in the at least one source store to limit or prevent the pressure rise in said source store.

14. The method of claim 11, further comprising a step of collecting permeation gas having migrated through the flexible wall into the liquid.

15. The method of claim 11, wherein the station includes a compressor and in that the collected permeation gas is injected at least in part at the inlet (suction) of the compressor.

* * * * *